United States Patent [19]

Smedley et al.

[11] Patent Number: 4,643,523

[45] Date of Patent: Feb. 17, 1987

[54] TELESCOPING WATER METER READING APPARATUS

[76] Inventors: James L. Smedley, 1113 N. Tolliver Rd.; Paul W. Blair, 120 Normal Ave., both of Morehead, Ky. 40351

[21] Appl. No.: 750,005

[22] Filed: Jul. 1, 1985

[51] Int. Cl.[4] .......................... G02B 5/00; G02B 23/22
[52] U.S. Cl. .................................... 350/319; 350/114; 73/201; 285/298
[58] Field of Search ............... 350/319, 110, 114, 115; 73/201; 285/298–302

[56] References Cited

U.S. PATENT DOCUMENTS

| | | | |
|---|---|---|---|
| 654,615 | 7/1900 | Estill . | |
| 1,161,882 | 11/1915 | Pettengill . | |
| 1,236,265 | 8/1917 | Casson . | |
| 2,268,263 | 12/1941 | Newell et al. | 285/298 |
| 2,968,208 | 1/1961 | Shaw | 350/319 |
| 3,534,603 | 10/1970 | Hook et al. . | |
| 4,215,916 | 8/1980 | Bell et al. | 350/114 |
| 4,395,091 | 7/1983 | Russo | 350/319 |
| 4,515,437 | 5/1985 | Story | 350/319 |

*Primary Examiner*—John K. Corbin
*Assistant Examiner*—Loha Ben
*Attorney, Agent, or Firm*—King and Schickli

[57] ABSTRACT

A meter reading apparatus includes a telescopic tubular viewer attached to the underground meter and provides a clear sight path through water in the meter box for easy meter reading. In a first embodiment, the viewer member is connected to the meter by a collar, brackets and clamps including a clevis and J-shaped connecting rod. In a second embodiment, the viewer is connected to the meter by a collar integrally formed with the meter and including threads for engaging the viewer. In both embodiments, the viewer is moisture tight and includes a transparent sealing lens at the top end, and an O-ring seal at the bottom end between the viewer and the meter. A coiled air tube may be provided to maintain ambient pressure inside the viewer during extension and retraction.

15 Claims, 3 Drawing Figures

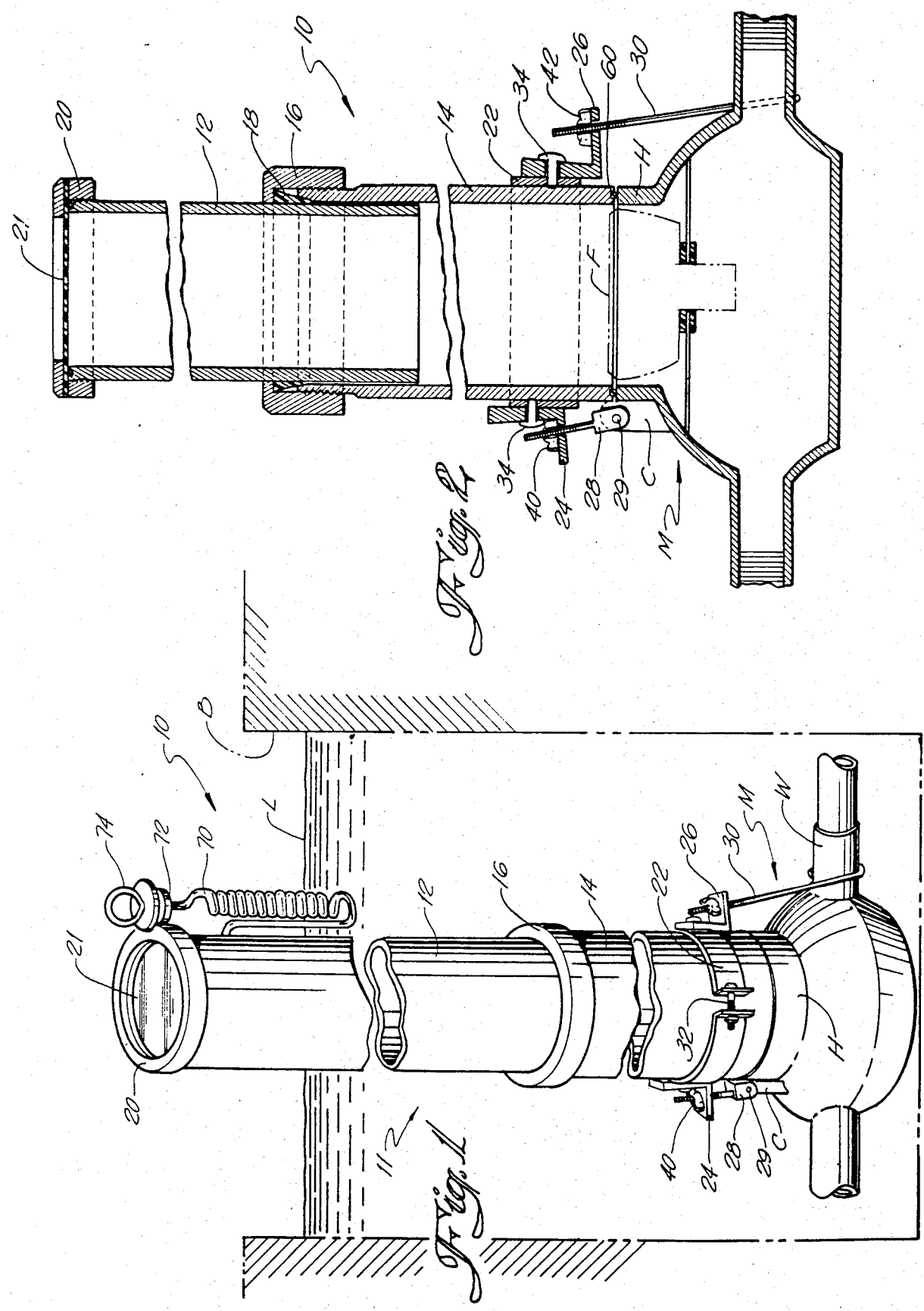

TELESCOPING WATER METER READING APPARATUS

TECHNICAL FIELD

The present invention relates generally to underground meter reading devices and, more particularly, to a sealed viewer that is connected to the meter and telescopes upwardly from the meter face to provide an unobstructed sight path to the meter face through accumulated water in the meter box.

BACKGROUND OF THE INVENTION

Utility water lines are buried below ground level in order to position them out of sight and to prevent freezing of the water in the winter. Meters connected to these lines to measure water use are typically contained in underground wells or boxes for the same reasons.

In many regions of poor drainage and low level regions in general, water from rains and snows frequently stands in the boxes above the face of the meter. Water above the meter face makes it difficult or even impossible to read the numbers on the meter. Thus, it often becomes necessary to bail water from the meter box in order to read the meter. This, of course, is a costly labor intensive job for the utility company. This cost must be passed on to the consumer through higher utility rates for water.

There have been many proposed solutions to this problem in the art. In U.S. Pat. No. 1,236,265 to Casson, a tapered tube is provided for reading the meter. The top end of the tube is sealed by a transparent member. In use, the tube is lowered into the meter box until the lower end engages the meter face. Trapped air in the tube forces most of the water outwardly to reduce interference with the reading of the meter. It should be recognized, however, that some water remains within the tube above the meter face. This water can, of course, prevent accurate meter reading. This is particularly true where the water is murky by being stirred up as, for example, may occur by the use of the tool itself.

U.S. Pat. No. 654,615 to Estill discloses a meter wherein the meter face is positioned on the upper end of an extension pipe or bar. While this does allow for the positioning of the meter face above ground level and any possible accumulation of water in the meter box for easy reading, the device has clear disadvantages that have prevented it from being commercially successful. First, it requires a complicated linkage between the raised meter face and the mechanism for measuring water use below the meter face at the water pipes. Disadvantageously, the linkage system is susceptible to service problems, particularly in the harsh, wet and corrosive environment of the meter box. Second, if the meter face is provided above ground level, part of the box must extend above the ground. A raised meter box of this type is unsightly. Further, it is dangerous as the raised portion could easily be tripped over and/or fallen upon. Third, the meter in Estill is not easily retrofitted to existing meters and, therefore, utility companies are not likely to replace existing meters with this totally different design. It is therefore seen that a need exists for an improved meter reading device.

SUMMARY OF THE INVENTION

Accordingly, it is a primary object of the present invention to provide an improved apparatus for the reading of underground meters overcoming the above-described limitations and disadvantages of the prior art.

Another object of the invention is to provide an improved meter reading apparatus that is attached to a meter and quickly and easily furnishes a clear sight path to the meter face.

An additional object of the present invention is to provide an improved meter reading apparatus that may be readily retrofitted to existing meters and eliminates the need for the meter reader to carry bulky and cumbersome viewing scopes and other meter reading tools between meters.

Additional objects, advantages and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for reading meters, such as water meters submerged in accumulated water in an underground meter box. The apparatus includes a telescopic viewer; the top end of the viewer being sealed by a transparent member or lens, and the bottom end of the viewer being adapted for sealing engagement with the meter. In one embodiment, a retaining collar and cooperating bracket assembly are provided for connecting the viewer to the meter. In a second embodiment, the collar is integrally formed with the meter and the viewer directly engages the collar, such as by screw threads.

In each embodiment an O-ring is disposed between the bottom end of the viewer and the meter so as to seal the viewer against the meter and prevent water in the meter box from entering and obstructing the sight path through the viewer.

As should be appreciated, the telescopic viewer may be extended from a retracted position within the meter box to a meter reading position wherein the top end of the viewer is positioned above any level of water in the meter box. This, of course, allows visual inspection and reading of the meter via a sight path through the viewer free of murky water and other obstructions to sight. Of course, it should also be recognized that in the raised position any silt or other debris on the top transparent member of the viewer may be easily cleaned by the meter reader with a rag or brush.

In order to maintain the integrity of the seal between the viewer and the meter during telescopic movement, a selectively openable air tube is provided for maintaining ambient pressure within the telescopic viewer. Preferably, the air tube is coiled for subsequent extension and positioning for easy access by the meter reader when it is desired to extend or retract the viewer for meter reading.

Still other objects of the present invention will become readily apparent to those skilled in this art from the following description wherein there is shown and described a preferred alternative embodiment of this invention. As it will be realized, the invention is capable of still other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 1 is a cutaway perspective view of the meter reading apparatus of the present invention retroactively fitted to an existing water meter;

FIG. 2 is a cutaway cross-sectional view of the meter reading apparatus of FIG. 1.

Figure 3:
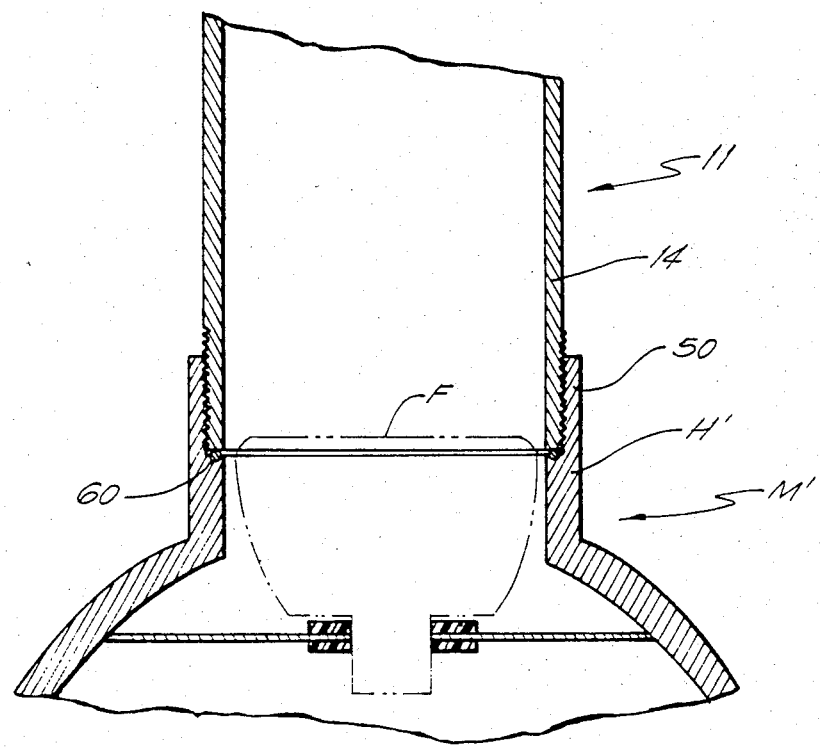
FIG. 3 is a broken away cross-sectional view of an alternative embodiment of the meter reading apparatus of FIG. 1 wherein the meter reader is directly connected to the meter by means of an integral threaded collar on the meter.

Reference will now be made in detail to the present preferred embodiment of the invention, an example of which is illustrated in the accompanying drawing.

DETAILED DESCRIPTION OF THE INVENTION

Reference is now made to FIGS. 1 and 2 showing an improved meter reading apparatus 10 of the present invention attached to a meter, such as water meter M with a meter face F to be read in an underground meter box B. The meter reading apparatus 10 includes a telescopic viewer 11 formed from a pair of concentrically disposed tubular members 12 and 14 in sliding engagement. As shown in FIG. 2, the tubular members 12 and 14 are joined together by means of an annular ring 16 that threadably engages the upper portion or end of the member 14. When the ring 16 is tightened, an annular sealing wedge 18 connected to the ring is forced down between the tubular members 12 and 14. The pressure exerted by the wedge 18 serves to restrict relative telescoping action between the members 12 and 14 and retain the members in a set position. The sealing wedge 18 allows telescopic movement, but still maintains water tightness. Preferably, the parts including the members 12, 14 are substantially rigid plastic to provide the desired sealing function, as well as rust and corrosion proofness.

The tubular member 12 may be extended from the member 14 to position the top of the telescopic viewer 11 above the water level L in the meter box M for meter reading. Conversely, the tubular member 12 may be retracted into the tubular member 14 as desired to allow the closing of the meter box lid (not shown) after the reading operation.

The top or distal end of the tubular member 12 is sealed by means of a cap 20 including a transparent viewing lens 21. The cap 20 may, for example, be attached to the end of the tubular member 12 by threads. The bottom end of the tubular member 14 is adapted for sealing engagement with the meter M, as will be discussed in detail below. Thus, when the lens cap 20 on the tubular member 12 is telescopically extended above the level L of residual water in the meter box B, it should be appreciated that the telescopic viewer 11 provides a moisture-tight and unobstructed sight path through the water in the meter box to the meter face F. Advantageously, this allows the meter reader operating the apparatus of the present invention to quickly and accurately read the numbers on the meter as desired.

As shown in FIGS. 1 and 2, the viewer 11 may be connected to an existing meter by first removing the meter face cover (not shown) attached to the cover mounting ear C on the meter housing H. The viewer 11 is then connected to the existing meter M by means of a retaining collar 22, a pair of L-shaped brackets 24, 26 and a means for clamping engagement, such as a clevis 28 and J-shaped connecting rod 30. The retaining collar 22 is securely and tightly fastened around the tubular member 14 of the viewer 11 by nut and bolt 32. The brackets 24, 26 are connected to the retaining collar 22 by means of fasteners, such as pop rivets 34. As shown in FIG. 2, the rivets 34 extend through the brackets 24, 26 and the collar 22. Therefore, when the collar 22 is tightened around the member 14, the heads of the rivets tend to bite into the outer surface of the plastic tubular member 14. This relationship assists in retaining the collar 22 against slipping once it is tightened.

As shown, the bracket 24 is positioned on the retaining collar 22 so as to overlie the cover mounting ear C. The clevis 28 connects to the bracket 24, and therefore permanently attaches one side of the viewer 11 to the meter M. As shown, the U-shaped clevis 28 is connected to the ear C by a pin 29. The threaded shaft of the clevis extends through the bracket 24 where a wing nut 40 is tightened to provide clamping pressure.

Similarly, the bracket 26 is positioned along the retaining collar 22 to overlie a water pipe receiving extension W of the meter housing 14 for connecting to a water pipe leading to or from the meter M. The J-shaped connecting rod 30 is then used to connect the bracket 26 and, therefore, a diametrically opposed second side of the viewer 11 to the meter M. Particularly, the J-shaped portion of the connecting rod 30 is hooked around the pipe W. The threaded end is extended through the bracket 26 and a wing nut 42 is used to apply clamping pressure and, therefore, retain and seal the viewer 11 tight to the meter housing H over the meter face F.

An alternative embodiment of the apparatus of the present invention is shown in FIG. 3. In this embodiment, the meter M' is made to directly accept the telescopic viewer 11. Particularly, the telescopic viewer 11, substantially as described above with respect to the embodiment of FIGS. 1 and 2, is connected directly to the meter M' by means of a threaded collar portion 50. As shown, the collar portion 50 is integrally formed with the meter housing H' so as to extend above the meter face F. The lower end of the tubular member 14 of the viewer 11 includes threads designed for engaging the mating threads of the collar portion 50.

In both embodiments of the meter reading apparatus, watertight sealing between the viewer 11 and the meter M is provided by an O-ring 60 of, for example, neoprene. Specifically, the O-ring 60 is provided along the lower edge of the tubular member 14 so as to engage the meter housing H in the two embodiments. The clamping pressure provided through the tightening of the wing nuts 40, 42 in the first embodiment, and the tightening of the viewer 11 in the collar portion 50 of the housing H' in the second embodiment assures that the seal is maintained. Since the viewer 11 is sealed at the top by means of the lens cap 20, sealed in the middle by the annular wedge 18 and sealed at the bottom by means of the O-ring 60, a clear unobstructed line of sight to the meter face F through the viewer is assured.

In order to maintain the water tightness of the sealed viewer 11 and assure easy telescopic operation, an extensible, coiled air tube 70 is provided with each embodiment. The coiled air tube 70 is connected to and communicates with the sealed interior of the viewer 11 adjacent the top of member 12 so as to maintain ambient pressure. This feature prevents water from being drawn into the viewer, and indeed permits extension of the tubular member 12 for viewing. As shown, a holder 72 may be provided along the edge of the lens cap 20 to maintain the air tube in a convenient position for easy access. A plug 74 seals the end of the tube when not in use. Opening the interior to ambient pressure through tube 70 not only insures against pulling a vacuum in the apparatus 10 during extension, but also prevents a build up of superatmospheric pressure that could prevent retraction.

Operation of the apparatus of the present invention is quite simple. After opening the meter box B, the meter reader checks the level of water in the box. If the water level L is above the lens cap 20 at the top of the viewer 11, the meter reader pulls the air tube 70 above the water level out of the meter box B and removes the plug 74. This allows air to pass into and from the interior of the viewer 11. The ring 16 is then loosened slightly, if necessary, taking care not to destroy the water tight seal. The tubular member 12 is then telescoped upwardly from the member 14 until the lens cap 20 is positioned above the water level L. As this is done, air enters the viewer through the tube 70 and the integrity of the seals 18 and 60 is thus maintained.

Once the lens cap 20 is positioned above the water level as desired, the ring 16 is tightened, if necessary. A rag or brush can then be used, if necessary, to remove dirt or silt from the lens cap 20 for clearer viewing. The meter M is then read through the clear unobstructed sight path provided by the viewer 11 through the tubes 12 and 14.

After reading the meter M, the ring 16 may be loosened slightly again and the tubular member 12 retracted back into the member 14 to lower the lens cap 20 back into the meter box B. As this is done, it should be appreciated that the air tube 70 allows the passage of air from the viewer thereby maintaining ambient pressure. It should also be appreciated that the ring 16 may of course be tightened so as to maintain the lens cap 20 just below the meter box lid thereby alleviating the need to readjust the height of the meter reading apparatus of the present invention under all but the most extreme water level conditions. After the repositioning of the viewer 11 and retightening of the ring 16 is completed, the plug 74 is replaced in the air tube 70 and the tube is dropped back into its rest position in the holder 72 for easy future access.

The foregoing description of the preferred embodiment of the invention has been presented for purposes of illustration and description. It is not intended to be exhaustive or to limit the invention to the precise form disclosed. Obvious modifications or variations are possible in light of the above teachings. For example, ambient air pressure could be maintained in the viewer 11 during telescopic movement through the provision of a collapsible plastic bag contained in a rigid sealed container attached to and communicating with the viewer. The embodiment was chosen and described to provide the best illustration of the principles of the invention and its practical application to thereby enable one of ordinary skill in the art to utilize the invention in various embodiments and with the various modifications as are suited to the particular use contemplated. All such modifications and variations are within the scope of the invention as determined by the appended claims when interpreted in accordance with the breadth to which they are fairly, legally and equitably entitled.

We claim:

1. An apparatus providing a clear sight path for reading a meter or the like located in an underground box, comprising:
    telescopic viewer means having a top end and a bottom end adapted for sealing engagement with the meter;
    means for connecting said viewer means to said meter;
    means for sealing said viewer means against the meter so as to prevent water in the meter box from entering and obstructing the sight path through said viewer means; and
    means for maintaining ambient pressure in said telescopic viewer means as said viewer means is extended and retracted;
    said telescopic viewer means being moisture tight and extensible to position said top end of said viewer means above any level of water in the meter box thereby allowing visual inspection and reading of the meter.

2. The meter reading apparatus of claim 1, wherein said viewer means includes a pair of concentrically disposed tubular members in sliding engagement and connected together by a sealing ring.

3. The meter reading apparatus of claim 1, wherein the top end is provided with a transparent lens cap that engages said viewer means.

4. The meter reading apparatus of claim 1, wherein said sealing means includes an O-ring disposed between said bottom end of said viewer means and the meter.

5. The meter reading apparatus of claim 1, wherein said connecting means includes a retaining collar fastened around said viewing means.

6. The meter reading apparatus of claim 5, wherein said connecting means further includes bracket means connected to said retaining collar.

7. The meter reading apparatus of claim 6, wherein said bracket means is connected to said retaining collar by fasteners extending through said bracket means and collar and into the surface of said viewer means so as to positively retain said viewer means.

8. The meter reading apparatus of claim 7, wherein said connecting means further includes clamping means connecting said bracket means to said meter and thereby retaining said viewing means in sealing engagement with said meter.

9. The meter reading apparatus of claim 8, wherein said clamping means includes a clevis and a substantially J-shaped connecting rod.

10. The meter reading apparatus of claim 1, wherein said connecting means is a viewer collar extending around said meter.

11. The meter reading apparatus of claim 10, wherein said collar is integrally formed with said meter and extends above the meter face.

12. The meter reading apparatus of claim 10, wherein said viewing means includes threads for engaging said collar.

13. The meter reading apparatus of claim 10, wherein said sealing means is an O-ring mounted in said collar for engagement with the bottom end of said viewer means.

14. The meter reading apparatus of claim 1, wherein said ambient pressure maintaining means comprises an extensible air tube connected to and communicating with said viewer means.

15. The meter reading apparatus of claim 14, wherein said ambient pressure maintaining means further comprises a plug member for selectively opening and sealing the free end of said air tube.

* * * * *